(12) United States Patent
Kromminga

(10) Patent No.: US 8,910,725 B2
(45) Date of Patent: Dec. 16, 2014

(54) HITCH ASSEMBLY AND CROSS-TUBE STRUCTURE FOR AN AGRICULTURAL IMPLEMENT

(75) Inventor: Gaylen James Kromminga, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/485,445

(22) Filed: May 31, 2012

(65) Prior Publication Data

US 2013/0319701 A1 Dec. 5, 2013

(51) Int. Cl.
*A01B 5/00* (2006.01)
*A01B 49/02* (2006.01)

(52) U.S. Cl.
USPC ........................................ 172/195

(58) Field of Classification Search
USPC ......... 172/195, 452, 311, 605, 319, 239, 328; 280/421, 414.5
See application file for complete search history.

(56) References Cited

U.S. PATENT DOCUMENTS

| | | | | |
|---|---|---|---|---|
| 2,297,938 A * | 10/1942 | Briscoe | | 37/372 |
| 2,328,343 A * | 8/1943 | Jacob | | 280/490.1 |
| 2,723,129 A * | 11/1955 | Sprague | | 280/414.5 |
| 3,480,085 A * | 11/1969 | Maple et al. | | 172/328 |
| 3,658,362 A * | 4/1972 | Fackler et al. | | 280/414.5 |
| 3,912,017 A | 10/1975 | Rehn | | |
| 4,408,777 A | 10/1983 | Carrick | | |
| 4,450,917 A * | 5/1984 | Hake | | 172/328 |
| 4,572,087 A * | 2/1986 | Brannan | | 111/56 |
| 4,723,787 A * | 2/1988 | Hadley et al. | | 172/311 |
| 4,809,786 A * | 3/1989 | Hoehn et al. | | 172/316 |
| 4,932,476 A * | 6/1990 | Hoehn | | 172/430 |
| 5,343,958 A | 9/1994 | Kromminga et al. | | |
| 5,409,069 A * | 4/1995 | Hake | | 172/400 |
| 5,413,182 A * | 5/1995 | Kromminga et al. | | 172/776 |
| 5,579,849 A * | 12/1996 | Houck | | 172/456 |
| 5,809,914 A | 9/1998 | Follmer | | |
| 5,992,535 A * | 11/1999 | Bierl et al. | | 172/328 |
| 6,186,244 B1 | 2/2001 | Friggstad | | |
| 6,276,462 B1 * | 8/2001 | Dietrich, Sr. | | 172/138 |
| 6,397,953 B1 * | 6/2002 | Ankenman | | 172/445.1 |
| 6,675,907 B2 * | 1/2004 | Moser et al. | | 172/311 |
| 6,679,339 B1 * | 1/2004 | Steinlage et al. | | 172/395 |
| 7,513,316 B2 | 4/2009 | Ruckle et al. | | |
| 7,631,817 B2 * | 12/2009 | Thompson et al. | | 239/159 |
| 7,850,190 B2 * | 12/2010 | Ruckle et al. | | 280/421 |
| 8,006,775 B2 | 8/2011 | Steinlage et al. | | |
| 8,215,413 B2 * | 7/2012 | Friggstad | | 172/452 |
| 8,336,639 B2 * | 12/2012 | Palen | | 172/328 |
| 2008/0121402 A1 * | 5/2008 | Ruckle et al. | | 172/605 |
| 2008/0190628 A1 * | 8/2008 | Steinlage et al. | | 172/166 |

* cited by examiner

*Primary Examiner* — Árpád Fábián-Kovács
(74) *Attorney, Agent, or Firm* — Rebecca L. Henkel

(57) ABSTRACT

An agricultural implement is provided that includes a frame assembly. Moreover, the agricultural implement includes a multiple wheel assemblies coupled to the frame assembly. Additionally, the agricultural implement includes a cross-tube coupled to wheel assemblies and positioned between the wheel assemblies. The agricultural implement includes a rear hitch assembly coupled to the frame assembly. The rear hitch assembly is also configured to be coupled to an auxiliary implement. Furthermore, the cross-tube is positioned vertically above the rear hitch assembly.

19 Claims, 5 Drawing Sheets

HITCH ASSEMBLY AND CROSS-TUBE STRUCTURE FOR AN AGRICULTURAL IMPLEMENT

BACKGROUND

The invention relates generally to agricultural implements, and more particularly, to a hitch assembly and cross-tube structure for an agricultural implement.

Agricultural implements are typically pulled through a field by a tow vehicle. The agricultural implements may direct tools to perform various functions in the field, such as fertilizing, opening, closing, cutting, and forming trenches. Certain agricultural implements may include a rear hitch assembly for towing an auxiliary implement (e.g., a tank assembly for storing agricultural material) behind the agricultural implement. As the size of farms grow, larger auxiliary implements may be utilized to store additional agricultural material (e.g., fertilizer, seeds, etc.). However, as auxiliary implement sizes increase, auxiliary implement weights also increase. An increased weight increases the stress applied to the hitch assembly and/or the agricultural implement. Accordingly, the hitch assembly may be constructed more robustly to withstand stress applied by larger auxiliary implements. Unfortunately, such reinforced hitch assemblies may reduce the ground clearance of the hitch assembly, possibly impeding maneuvering of the agricultural implement, and/or interfering with the agricultural functions of the implement.

BRIEF DESCRIPTION

In one embodiment, an agricultural implement has a frame assembly, multiple wheel assemblies, a cross-tube, and a rear hitch assembly. The wheel assemblies are coupled to the frame assembly. The cross-tube is coupled to the frame assembly. Moreover, the cross-tube is coupled to the wheel assemblies and is positioned between the wheel assemblies. Furthermore, the rear hitch assembly is coupled to the frame assembly and configured to be coupled to an auxiliary implement. The cross-tube is positioned vertically above the rear hitch assembly.

In another embodiment, an agricultural implement has a frame assembly, multiple wheel assemblies, a cross-tube, and a hitch assembly. The wheel assemblies are coupled to the frame assembly. Moreover, the cross-tube is coupled to the wheel assemblies and positioned between the wheel assemblies. Furthermore, the hitch assembly is coupled to the frame assembly and the cross-tube and has a hitch configured to be coupled to an auxiliary implement, a tow vehicle, or some combination thereof.

In another embodiment, an agricultural implement has a frame assembly, multiple wheel assemblies, a cross-tube, and a hitch assembly. The wheel assemblies are coupled to the frame assembly. The agricultural implement also includes multiple support bracket assemblies. Each support bracket assembly is coupled to a respective one of the wheel assemblies. Moreover, the cross-tube is coupled to the support bracket assemblies and positioned between the support bracket assemblies. Furthermore, the hitch assembly is coupled to the frame assembly and has a hitch configured to be coupled to an auxiliary implement, a tow vehicle, or some combination thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
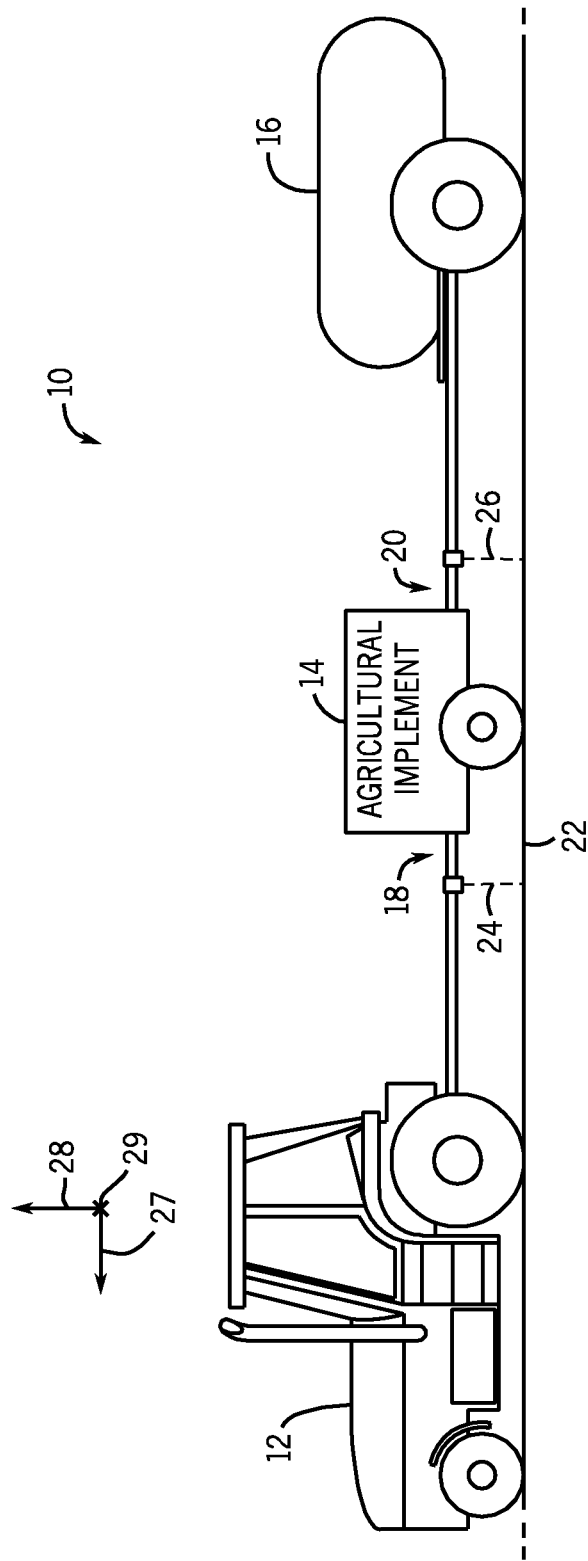
FIG. 1 is a side view of an embodiment of an agricultural system with an agricultural implement having a rear hitch assembly.

FIG. 1 is a side view of an embodiment of an agricultural system 10. The agricultural system 10 includes a tow vehicle 12, an agricultural implement 14, and a tank assembly 16. The tow vehicle 12 may be any vehicle suitable for towing the agricultural implement 14, such as a tractor, off-road vehicle, work vehicle, and so forth. Additionally, the agricultural implement 14 may be any implement suitable for agricultural use, such as a tiller implement, a fertilizer implement, or another agricultural implement. Furthermore, although the tank assembly 16 is illustrated, in other embodiments, any suitable auxiliary implement may be towed behind the agricultural implement 14.

The tow vehicle 12 is coupled to the agricultural implement 14 by a front hitch assembly 18. As illustrated, the agricultural implement 14 is coupled to the tank assembly 16 by a rear hitch assembly 20. The agricultural system 10 travels over a surface 22, such as the ground, a road, a field, or another surface. A distance 24 between a hitch of the front hitch assembly 18 and the surface 22 defines the ground clearance at the front of the agricultural implement 14. Additionally, a distance 26 between a hitch of the rear hitch assembly 20 and the surface 22 defines the ground clearance at the rear of the agricultural implement 14. In certain embodiments, changes in the distance 24 may result in an equivalent or opposite change in the distance 26. The change in the distance 26 may cause a force against the hitch of the tank assembly 16, thereby increasing stress on the tank assembly 16 and/or the agricultural implement 14. Accordingly, in certain embodiments, the rear hitch assembly 20 may be configured to maintain a substantially constant distance 26 during operation of the agricultural system 10 to reduce stress on the agricultural implement 14 and/or the tank assembly 16.

For purposes of discussion, reference may be made to a direction 27 parallel to the direction of travel of the agricultural implement 14, a vertical direction 28, and a direction 29 perpendicular to the direction of travel of the agricultural implement 14. Furthermore, as discussed in detail below, certain embodiments of the agricultural implement 14 may include reinforced structures to accommodate heavier tank assemblies 16 without substantially lowering the ground clearance of the agricultural implement 14. By maintaining or increasing the ground clearance, the agricultural implement 14 may be used without interfering with plants and/or residue in the field.

Figure 2:
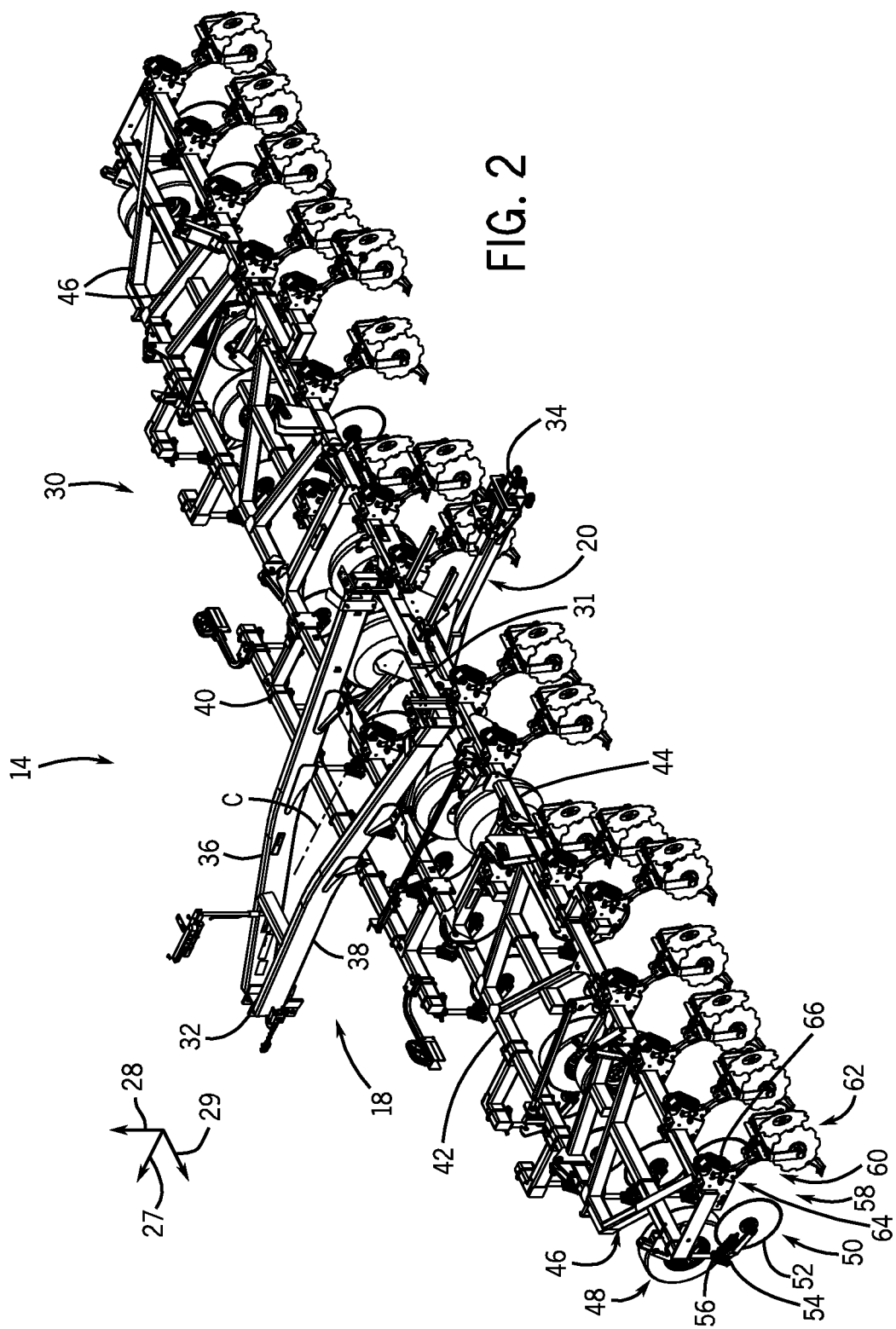
FIG. 2 is a perspective view of an embodiment of the agricultural implement of FIG. 1 having a rear hitch assembly.

FIG. 2 is a perspective view of an embodiment of the agricultural implement 14 of FIG. 1. For purposes of discussion, reference may be made to a centerline C of the agricultural implement 14. The illustrated embodiment of the implement 14 includes a frame assembly 30, a cross-tube 31, the front hitch assembly 18, and the rear hitch assembly 20. As illustrated, the cross-tube 31 is positioned vertically below the front hitch assembly 18 in the direction 28. However, in other embodiments, the cross-tube 31 may be positioned above the front hitch assembly 18. Furthermore, the front hitch assembly 18 is coupled to the frame assembly 30 (e.g., by one or more brackets, braces, bolts, welded connections, or another suitable connection). Moreover, the cross-tube 31 may be positioned vertically above both the frame assembly 30 and the rear hitch assembly 20 in the direction 28. In other embodiments, the cross-tube 31 may be positioned vertically above the rear hitch assembly 20, and coplanar with or vertically below the frame assembly 30 in the direction 28. In addition, in some embodiments the cross-tube 31 may be positioned vertically above the frame assembly 30 in the direction 28, and coplanar to or vertically below the frame assembly 30 in the direction 28.

The front hitch assembly 18 includes a hitch 32 configured to be coupled to the tow vehicle 12. Furthermore, the rear hitch assembly 20 includes a hitch 34 configured to be coupled to the tank assembly 16. As illustrated, the front hitch assembly 18 includes a first arm 36 and a second arm 38 arranged in a y-shape. However, other embodiments of the front hitch assembly 18 may include 1, 2, 3, or more arms arranged in a suitable arrangement. For example, some embodiments may include arms arranged in a t-shape, u-shape, a-shape, or perpendicular configurations. Additionally, the first and second arms 36 and 38 of the front hitch assembly 18 are coupled to the frame assembly 30. In certain embodiments, the front hitch assembly 18 may be coupled to the frame assembly 30 using welded connections, bolts, brackets, or other suitable connections for coupling the front hitch assembly 18 either statically or rotatably to the frame assembly 30.

As illustrated, the frame assembly 30 includes a front cross-bar 40, a middle cross-bar 42, a rear cross-bar 44, and support members 46. In the illustrated embodiment, the cross-bars 40, 42, and 44 are configured in a parallel arrangement. Certain embodiments of the frame assembly 30 may include cross-bars oriented in a non-parallel arrangement and may include or exclude the support members 46. Additionally, some embodiments of the frame assembly may include more or fewer cross-bars. As illustrated, the support members 46 extend cross-wise to the cross-bars 40, 42, and 44 to provide structural integrity to the frame assembly 30.

The agricultural implement 14 includes multiple wheels 48. As discussed below, the wheels 48 enable adjustment of the height of the frame assembly. The illustrated embodiment of the agricultural implement 14 includes ten wheels 48, but other embodiments of the agricultural implement 14 may include 1, 2, 3, 4, 5, or more wheels. Further, the agricultural implement 14 includes field preparation assemblies 50 coupled to the front cross-bar 40 and to the middle cross-bar 42. The illustrated field preparation assemblies 50 include coulter discs 52, but certain field preparation assemblies 50 may include harrows (e.g., disc harrows) or other suitable tools for preparing a field for deposition of agricultural material (e.g., seeds, fertilizer) into soil. Additionally, each field preparation assembly 50 includes a pivoting joint 54 configured to facilitate rotation of the coulter disc 52 when a force is applied to the field preparation assembly 50. Moreover, each field preparation assembly 50 includes a spring 56 configured to bias the coulter disc 52 toward the soil surface. The illustrated embodiment of the agricultural implement 14 includes nineteen preparation assemblies 50, but other embodiments of the agricultural implement 14 may include 0, 5, 10, 15, 20, or another number preparation assemblies. Further, each of the preparation assemblies 50 may be coupled either to a cross-bar (e.g., cross-bars 40, 42, or 44) or to the support members 46 by one or more brackets, braces, bolts, welded connections, or another suitable connection.

The agricultural implement 14 includes multiple ground engaging assemblies 58 coupled to the rear cross-bar 44, and one ground engaging assembly 58 coupled to the middle cross-bar 42. As illustrated, the ground engaging assemblies 58 each include a ground engaging tool 60, a closing system 62, a pivot 64, and a spring 66. In some embodiments, the ground engaging tool 60 may be a hollow blade (e.g., knife) configured to engage soil and to deliver a fertilizer (e.g., anhydrous ammonia) on or into the soil. In other embodiments, the ground engaging tool 60 may be a plowshare or other suitable tool for engaging soil. The closing systems 62 are configured to close an opening in the soil formed by the ground engaging tool 60, such as the disc sealers illustrated in the present embodiment.

The pivot 64 is configured to facilitate rotation of the ground engaging assembly 58 when the ground engaging tool 60 contacts an obstruction (e.g., rock) to protect the ground engaging tool 60 and/or the agricultural implement 14. When the ground engaging tool 60 contacts an obstruction, the ground engaging assembly 58 rotates and compresses the spring 66. After the ground engaging tool 60 no longer contacts the obstruction, the spring 66 decompresses and returns the ground engaging assembly 58 to the position maintained before encountering the obstruction. While the illustrated embodiment of the agricultural implement 14 includes nineteen ground engaging assemblies 58, other embodiments of the agricultural implement 14 may include 1, 2, 3, 4, 5, or more ground engaging assemblies 58. Further, the ground engaging assemblies 58 may be coupled to the frame assembly 30 by one or more brackets, braces, bolts, welded connections, or another suitable connection.

In certain agricultural implements, the size of various components of the agricultural implement 14 (e.g., frame assembly 30, front hitch assembly 18, and rear hitch assembly 20) may be increased to enable the agricultural implement 14 to tow larger auxiliary implements. However, by increasing the size of the various components, the ground clearance of the agricultural implement 14 may be reduced. Accordingly, the functionality of the agricultural implement 14 may be reduced. As discussed in detail below, certain embodiments enable the reinforcement of the agricultural implement 14 without reducing ground clearance thereby utilizing a more robust frame without reducing functionality of the agricultural implement. For example, the agricultural implement 14 may be used in a side-dressing application (e.g., of a fertilizer). In side-dressing applications, nutrients are placed on or in the soil near the roots of growing plants. As will be appreciated, a higher ground clearance of the agricultural implement 14 enables side-dressing plants of greater height (e.g., plant species or time elapsed in the plant's growth). In other words, by maintaining or raising the ground clearance, the agricultural implement 14 enables side-dressing applications to be performed for a larger variety of plants and/or later in a plant's growth cycle. Additionally, greater ground clearance of the agricultural implement 14 reduces the likelihood of field residue interfering with operation of the agricultural implement 14 (e.g., when applying fertilizer in the fall).

Figure 3:
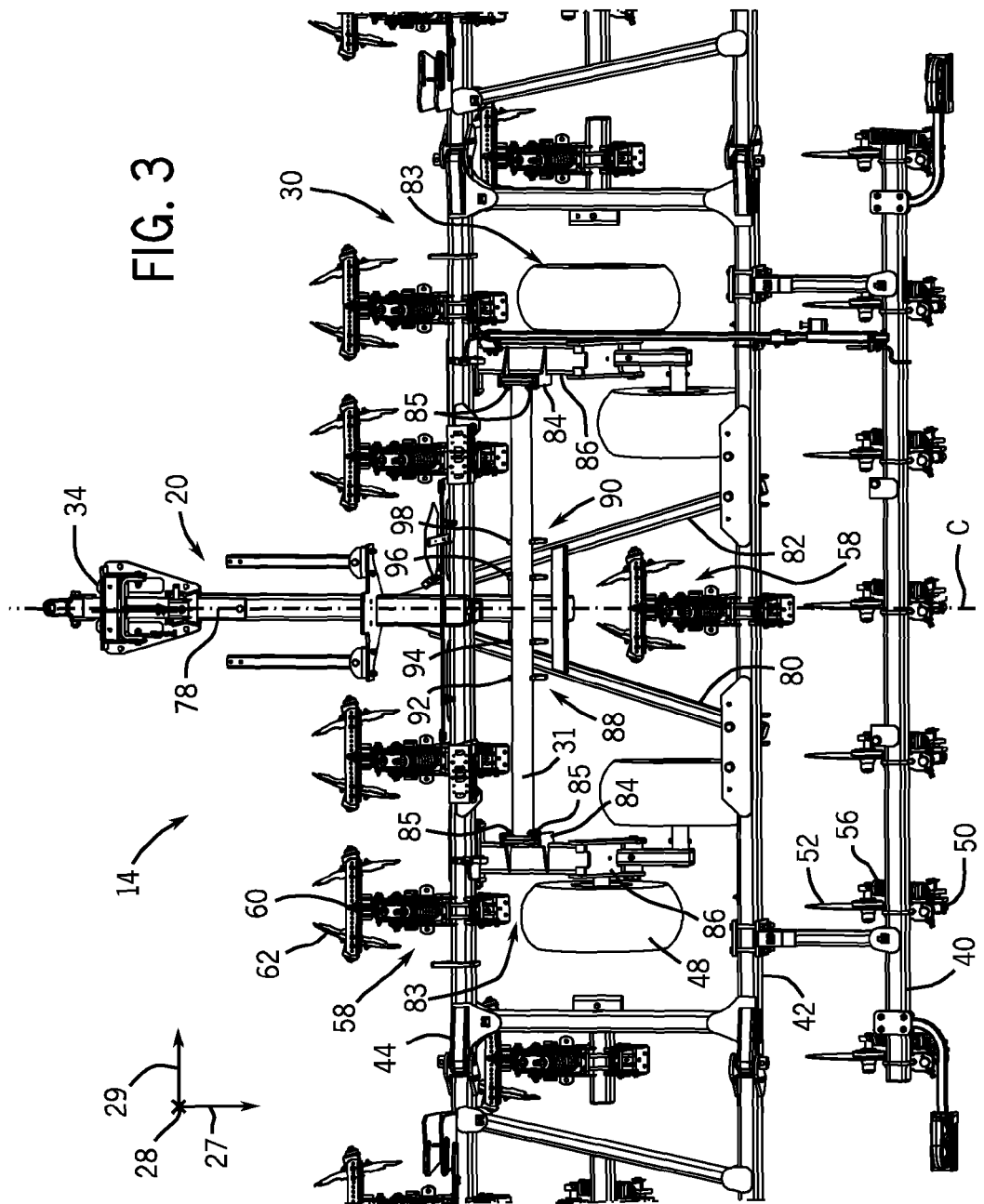
FIG. 3 is a top view of a portion of the agricultural implement of FIG. 2 having a cross-tube coupled to a frame assembly and the rear hitch assembly.

FIG. 3 is a top view of a portion of the agricultural implement 14 of FIG. 2 having a reinforced frame assembly 30. The illustrated embodiment of the agricultural implement 14 has the front hitch assembly 18 omitted for clarity. As previously discussed, the agricultural implement 14 includes the rear hitch assembly 20. The rear hitch assembly 20 extends rearwardly in the direction 27. In some embodiments, a longitudinal axis 78 of the rear hitch assembly 20 may be positioned along the centerline C of the agricultural implement 14. The rear hitch assembly 20 includes a first arm 80 and a second arm 82 arranged in a y-shape. As illustrated, a ground engaging assembly 58 is coupled to the middle cross-bar 42, and positioned between the first arm 80 and the second arm 82. Furthermore, as illustrated, the y-shape formed by the first arm 80 and the second arm 82 enables the ground engaging assembly 58 to be disposed along the centerline C of the implement 14.

As discussed in detail below, the first arm 80 and the second arm 82 are rotatably coupled to the middle cross-bar 42. In the present embodiment, the agricultural implement 14 includes wheel assemblies 83 coupled to the frame assembly 30 and located adjacent to the first and second arms 80 and 82 of the rear hitch assembly 20. The wheel assemblies 83 each include a cross-tube support bracket assembly 84. As illustrated, the cross-tube 31 is coupled between the two cross-tube support bracket assemblies 84. Specifically, the support bracket assemblies 84 are coupled to the cross-tube 31 by bolts 85, but in other embodiments, may couple the support bracket assemblies 84 may be coupled to the cross-tube 31 by one or more brackets, braces, welded connections, or other suitable connections. The bracket assemblies 84 are coupled to structural supports 86 to facilitate the movement of the cross-tube 31 with the wheels 48. As discussed below, the support bracket assemblies 84 may extend vertically upwardly from the structural supports 86 in the direction 28 to a position above the frame assembly 30 and/or the rear hitch assembly 20. Additionally, the structural supports 86 are configured to enable the height of the frame assembly 30 to be adjusted. For example, the structural supports 86 may be rotated upwardly and/or downwardly, thereby varying the distance between the wheels 48 and the frame assembly 30.

As illustrated, the agricultural implement 14 includes bracket assemblies 88 and 90. Specifically, the bracket assembly 88 includes brackets 92 and 94 coupled to the cross-tube 31. The bracket assembly 88 is configured to enable the first arm 80 to slidably couple to the cross-tube 31. Similarly, the bracket assembly 90 includes brackets 96 and 98 coupled to the cross-tube 31. The bracket assembly 90 is configured to enable the second arm 82 to slidably couple to the cross-tube 31. As will be appreciated, by coupling the rear hitch assembly 20 to the cross-tube 31 at a location vertically above the rear hitch assembly 20, the rear hitch assembly 20 is able to rotate to a position proximate to the front cross-bar 40. In other words, the cross-tube 31 enables coupling the rear hitch assembly 20 to the frame assembly 30 without substantially decreasing the ground clearance of the agricultural implement 14. Accordingly, the positions of the cross-tube 31 and support bracket assemblies 84 enable an increase in the clearance between the rear hitch assembly 20 and the ground. As previously discussed, by providing additional ground clearance, the agricultural implement 14 may facilitate increased flexibility in the locations and seasonal time periods suitable for using the agricultural implement 14.

Figure 4:
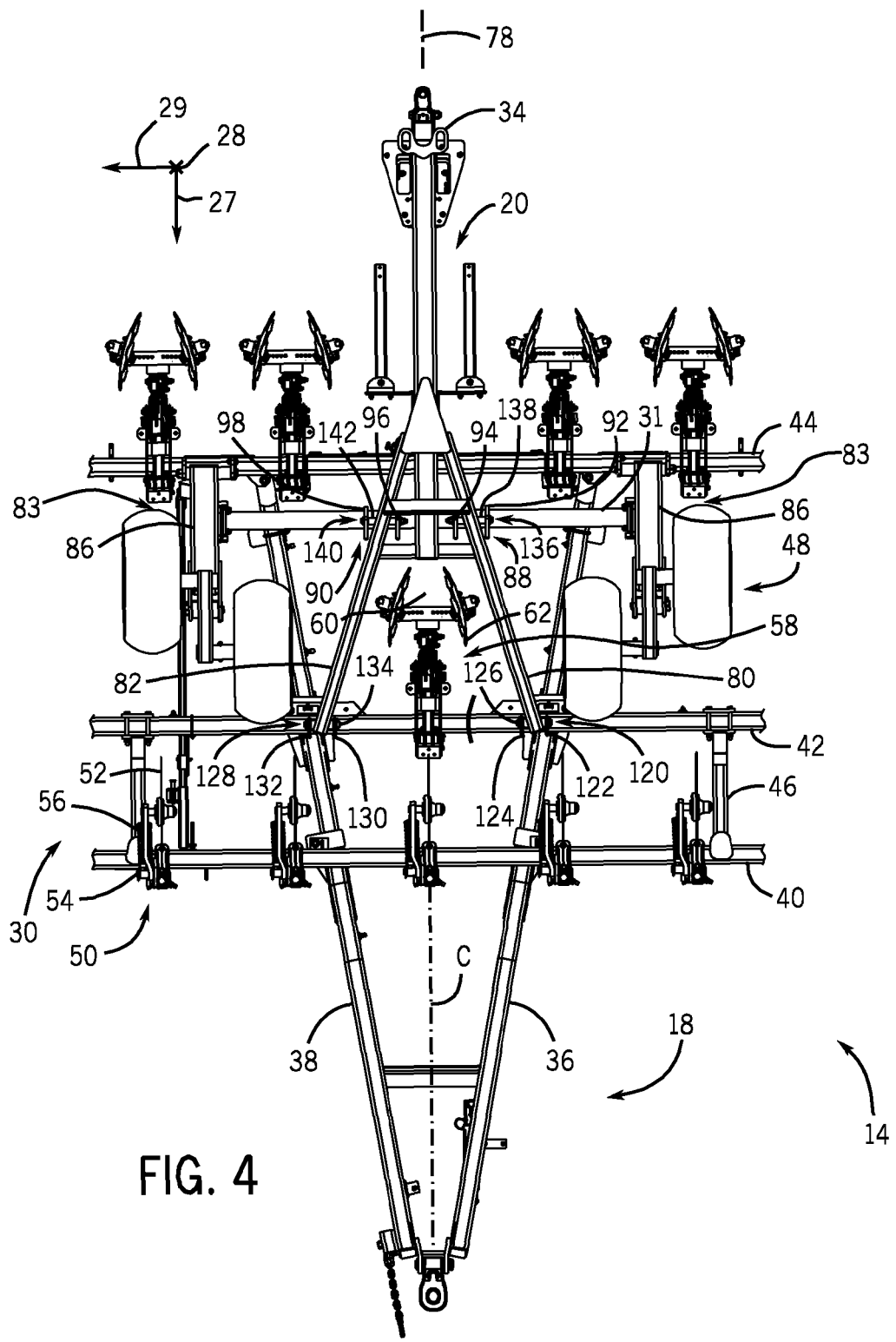
FIG. 4 is a bottom view of a portion of the agricultural implement of FIG. 2 having a cross-tube coupled to a frame assembly and the rear hitch assembly.

FIG. 4 is a bottom view of a portion of the agricultural implement of FIG. 2. As illustrated, the rear hitch assembly 20 includes a first pin assembly 120 coupling the first arm 80 to the middle cross-bar 42. The first pin assembly 120 is coupled to brackets 122 and 124. Specifically, the first pin assembly 120 includes a pin 126 inserted through an opening in the first arm 80, and respective openings in the brackets 122 and 124 to pivotably secure the first arm 80 to the middle cross-bar 42. As will be appreciated, the first pin assembly 120 enables the first arm 80 to rotate about the pin 126 in the vertical direction 28. Likewise, the rear hitch assembly 20 includes a second pin assembly 128 coupling the second arm 82 to the middle cross-bar 42. Similar to the first pin assembly 120, the second pin assembly 128 is coupled to brackets 130 and 132 via a pin 134. Specifically, the pin 134 is inserted through an opening in the second arm 82, and respective openings in the brackets 130 and 132 to pivotably secure the second arm 82 to the middle cross-bar 42, and to enable the second arm 82 to rotate about the pin 134 in the vertical direction 28. Although the illustrated embodiments of the pin assemblies 120 and 128 include pins coupled to brackets to facilitate rotation of the rear hitch assembly 20, some embodiments of the pin assemblies 120 and 128 may include other suitable connections (e.g., hinges, ball and socket joints, etc.) that enable rotation of the rear hitch assembly 20 in a suitable direction.

As discussed above, the bracket assemblies 88 and 90 are coupled to the cross-tube 31. A third pin assembly 136 includes a pin 138, and may include additional components (e.g., nuts, bolts, washers, clamps, etc.), suitable for securing the third pin assembly 136 to the bracket assembly 88. As discussed below, the bracket assembly 88 and the pin assembly 136 together form a slidable connection between the first arm 80 and the cross-tube 31. The slidable connection is formed by inserting the pin 138 through an opening in the first arm 80, and respective openings in the brackets 92 and 94. A fourth pin assembly 140 includes a pin 142, and may include additional components suitable for securing the fourth pin assembly 140 to the bracket assembly 90. Similar to the bracket assembly 88, the bracket assembly 90 and the pin assembly 140 together form a slidable connection between the second arm 82 and the cross-tube 31. The slidable connection is formed by inserting the pin 142 through an opening in the second arm 82, and respective openings in the bracket 96 and the bracket 98. For example, in certain embodiments, each of the openings is a slot configured to facilitate movement of the pins 138 and 142 relative to the brackets 92, 94, 96, and 98.

Figure 5:
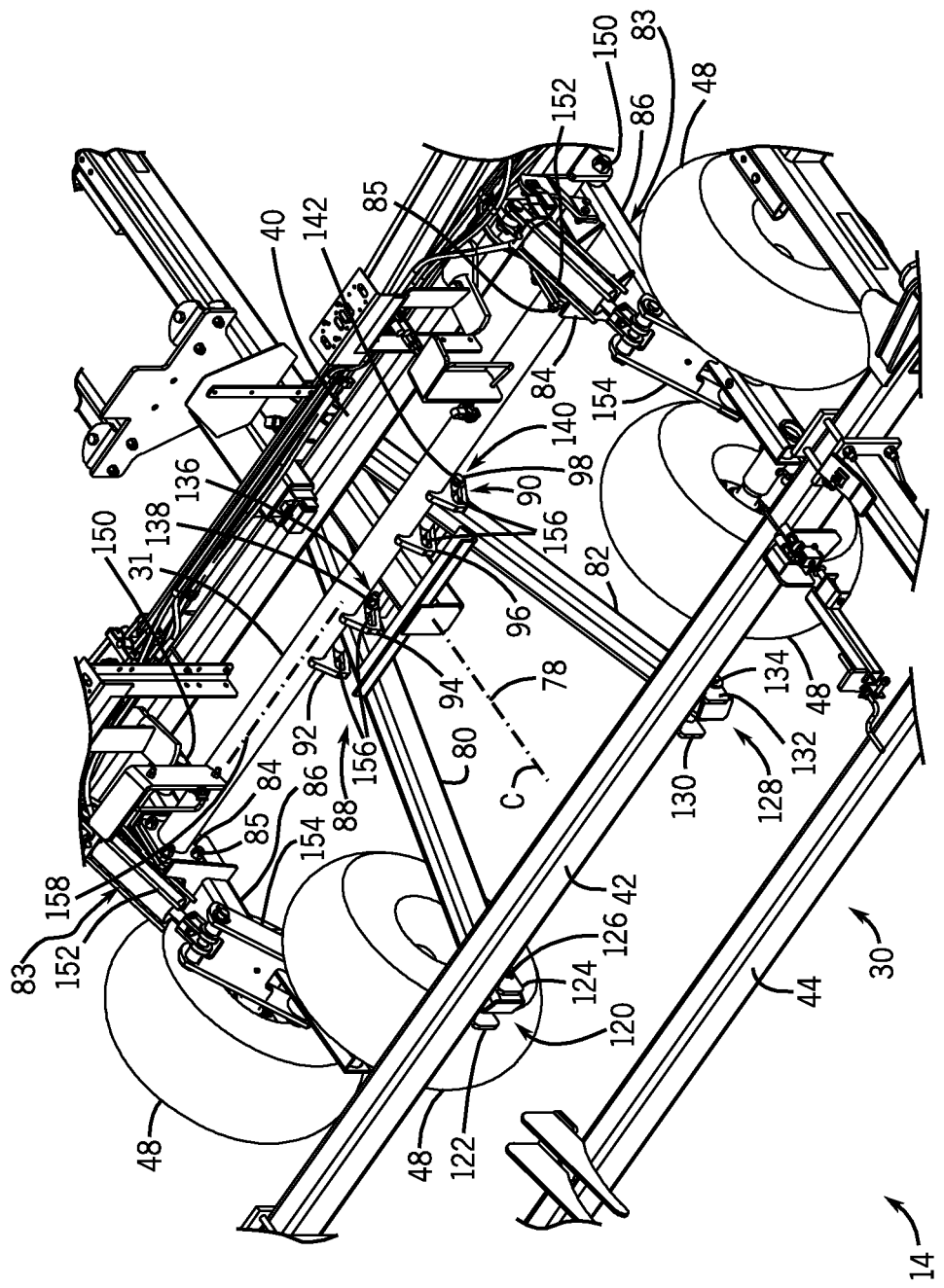
FIG. 5 is a perspective view of a portion of the agricultural implement of FIG. 2.

FIG. 5 is a perspective view of a portion of the agricultural implement 14 of FIG. 1. The front hitch assembly 18, the field preparation assemblies 50, and the ground engaging assemblies 58 are omitted from FIG. 5 to more clearly illustrate other portions of the agricultural implement 14. As previously discussed, adjusting a position of the wheels 48 varies the height of the frame assembly 30. Specifically, rotating the structural supports 86 varies the position of the wheels 48, thereby adjusting the height of the frame assembly 30. The structural supports 86 are coupled to the front cross-bar 40 by pin assemblies 150. As will be appreciated, the pin assemblies 150 facilitate rotation of the structural supports 86 relative to the frame assembly 30. To achieve rotation of the structural supports 86, the agricultural implement 14 includes actuators 152 and mounting brackets 154. In the illustrated embodiment, the actuators 152 are hydraulic actuators, while in other embodiments the actuators 152 may be another suitable type of actuator.

As the actuators 152 extend, the corresponding mounting brackets 154 rotate in a downward direction thereby inducing a corresponding structural support 86 to rotate in the downward direction 28. In other words, by extending the actuators 152, the actuators 152 drive the wheels 48 downwardly relative to the frame assembly 30 along the vertical direction 28, thereby raising the frame assembly 30 to a greater height above the surface 22. As will be appreciated, the actuators 152 may also be used to lower the frame assembly 30 relative to the surface 22 by retracting the actuators 152. When the actuators 152 are retracted, the mounting brackets 154 and the structural supports 86 rotate in an upward direction, thereby driving the wheels 48 upwardly in the vertical direction 28, and lowering the frame assembly 30.

When the height of the frame assembly 30 is adjusted, the support structures 86 move in the opposite vertical direction 28 of the frame assembly 30. In other words, as the frame assembly 30 is raised, the support structures 86 extend downwardly in the vertical direction 28. As the actuators 152 induce the support structures 86 to move in the vertical direction 28, the support bracket assemblies 84, which are coupled to the support structures 86, move in the same vertical direction 28. Accordingly, the cross-tube 31 also moves in the same vertical direction 28. In certain embodiments, the cross-tube 31 may move to a position vertically below the frame assembly 30. In other embodiments, the cross-tube 31 may remain vertically above the frame assembly 30 even when the cross-tube 31 is at its lowest point relative to the frame assembly 30. Moreover, when the support structures 86 pivot about the pin assemblies 150, the support structures 86 move in the direction 27 in addition to moving in the vertical direction 28. The movement of the support structures 86 in the direction 27 induces the support bracket assemblies 84 to rotate. The rotation of the support bracket assemblies 84 induces the cross-tube 31 to rotate about a longitudinal axis 158 of the cross-tube 31.

As illustrated, each of the brackets 92, 94, 96, and 98 are generally coupled below the cross-tube 31 and are configured to couple the rear hitch assembly 20 to the cross-tube 31. In the illustrated embodiment, the cross-tube 31 is positioned above the rear hitch assembly 20 in the vertical direction 28. Additionally, each of the brackets 92, 94, 96, and 98 includes a slot 156 into which the pin 138 or the pin 142 is inserted. Each slot 156 is wider than a diameter of the corresponding pin. Accordingly, the pins 138 and 142 may slide within the slots 156. As previously discussed, the cross-tube 31 rotates about its axis 158 when the height of the frame assembly 30 is adjusted. As the cross-tube 31 rotates about its axis 158, the brackets 92, 94, 96, and 98 also rotate about the longitudinal axis 158 of the cross-tube 31. As will be appreciated, during the rotation of the cross-tube 31, the pins 138 and 142 slide within the slots 156 to enable the rear hitch assembly 20 to rotate relative to the frame assembly 30. In other words, the combination of pin assemblies 120, 128, 136, and 140 with bracket assemblies 88 and 90 enable the rear hitch assembly 20 to rotate in relation to the frame assembly 30, while positioning the cross-tube 31 above the rear hitch assembly 20 to provide additional ground clearance.

As previously discussed, the height of the frame assembly 30 may be adjusted by an automatic or manual system. Additionally or alternatively, operation of the agricultural implement 14 on an uneven surface may induce the height of the frame assembly 30 to vary. As discussed below, the rear hitch assembly 20 may compensate for the changes in the height of the frame assembly 30 to maintain a substantially consistent distance 26 between the hitch 34 and the surface 22, thereby reducing stress on the agricultural implement 14 (e.g., the rear hitch assembly 20, the front hitch assembly 18) and the tank assembly 16. Specifically, the hitch 34 of the rear hitch assembly 20 is connected to the tank assembly 16 at the height of a tank assembly hitch. By enabling the rotation of the rear hitch assembly 20 in relation to the frame assembly, the angle at which the rear hitch assembly 20 couples to the frame assembly 30 may vary. The variability of the angle between the rear hitch assembly 20 and the frame assembly 30 enables the agricultural implement 14 to compensate for changes to the height of the frame assembly 30 during operation.

By enabling the hitch 34 to maintain a substantially constant height during operation, the agricultural implement reduces stress (e.g., sheer) on the agricultural implement 14 (e.g., the rear hitch assembly 20) and the tank assembly 16. Additionally, by enabling the reinforcement of the agricultural implement 14 without reducing ground clearance by mounting the cross-tube 31 above the hitch assembly 20, the agricultural implement 14 may enable the use of larger auxiliary implements (e.g., tank assembly 16) without substantially interfering with the operation of the agricultural implement 14. For example, greater ground clearance may enable the operation of the agricultural implement 14 in fields with taller plants and/or during later periods in a plant's growth cycle than is possible with an implement having lower ground clearance with a cross-tube mounted below a hitch assembly.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement comprising:
a frame assembly;
a plurality of wheel assemblies coupled to the frame assembly;
a cross-tube coupled to the plurality of wheel assemblies and positioned entirely between the plurality of wheel assemblies, wherein the cross-tube is configured to rotate as the plurality of wheel assemblies is raised or lowered relative to the frame assembly; and
a rear hitch assembly coupled to the frame assembly and the cross-tube and configured to be coupled to an auxiliary implement, wherein the cross-tube longitudinally overlaps the rear hitch assembly along a direction of travel of the agricultural implement, and the cross-tube is positioned vertically above the rear hitch assembly at least where the cross-tube longitudinally overlaps the rear hitch assembly.

2. The agricultural implement of claim 1, wherein the rear hitch assembly comprises a first arm and a second arm, and wherein the first and second arms form a y-shape.

3. The agricultural implement of claim 1, wherein the agricultural implement is configured to receive fertilizer from the auxiliary implement.

4. The agricultural implement of claim 3, wherein the agricultural implement is configured to deposit the fertilizer into soil.

5. The agricultural implement of claim 4, wherein the fertilizer comprises anhydrous ammonia.

6. The agricultural implement of claim 1, wherein the rear hitch assembly is pivotably coupled to the frame assembly.

7. The agricultural implement of claim 1, wherein the frame assembly comprises a cross-bar and a pin assembly coupling the rear hitch assembly to the cross-bar, and wherein the pin assembly is configured to enable the rear hitch assembly to rotate in relation to the frame assembly.

8. The agricultural implement of claim 1, wherein the rear hitch assembly is slidably coupled to the cross-tube.

9. The agricultural implement of claim 1, comprising a bracket assembly and a pin assembly, wherein the bracket assembly is coupled to the cross-tube and the pin assembly couples the rear hitch assembly to the bracket assembly, the pin assembly being configured to slide within the bracket assembly to facilitate movement of the rear hitch assembly relative to the cross-tube.

10. The agricultural implement of claim 1, comprising a first bracket and a second bracket, wherein the first and second brackets extend above the frame assembly and the cross-tube is coupled between the first and second brackets, wherein the first and second brackets are each coupled to a respective wheel assembly of the plurality of wheel assemblies.

11. The agricultural implement of claim 9, wherein the bracket assembly is rigidly coupled to the cross-tube, and the pin assembly is configured to slide in the bracket assembly as the cross-tube rotates.

12. An agricultural implement comprising:
a frame assembly;
a plurality of wheel assemblies coupled to the frame assembly;
a cross-tube coupled to the plurality of wheel assemblies and positioned entirely between the plurality of wheel assemblies, wherein the cross-tube is configured to rotate as the plurality of wheel assemblies is raised or lowered relative to the frame assembly; and
a hitch assembly coupled to the frame assembly and the cross-tube, wherein the hitch assembly comprises a hitch configured to be coupled to an auxiliary implement, a tow vehicle, or a combination thereof;
wherein the cross-tube longitudinally overlaps the hitch assembly along a direction of travel of the agricultural implement, and the cross-tube is positioned vertically above the hitch assembly at least where the cross-tube longitudinally overlaps the hitch assembly.

13. The agricultural implement of claim 12, wherein the cross-tube comprises a plurality of brackets, and wherein a pin assembly slidably couples the hitch assembly to the plurality of brackets.

14. The agricultural implement of claim 12, comprising a height adjustment system configured to lower the frame assembly to facilitate engagement of soil by a ground engaging assembly and to raise the frame assembly to facilitate disengagement of the soil by the ground engaging assembly.

15. The agricultural implement of claim 14, wherein the height adjustment system comprises a hydraulic actuator.

16. The agricultural implement of claim 12, wherein the frame assembly and the hitch assembly are pivotably coupled to one another to enable the hitch of the hitch assembly to maintain a substantially constant distance from the soil as the frame assembly moves relative to soil.

17. An agricultural implement comprising:
a frame assembly;
a plurality of wheel assemblies coupled to the frame assembly;
a plurality of support bracket assemblies, each support bracket assembly coupled to a respective one of the plurality of wheel assemblies;
a cross-tube coupled to the plurality of support bracket assemblies and positioned entirely between the plurality of support bracket assemblies, wherein the cross-tube is configured to rotate as the plurality of wheel assemblies is raised or lowered relative to the frame assembly; and
a hitch assembly coupled to the frame assembly and the cross-tube, wherein the hitch assembly comprises a hitch configured to be coupled to an auxiliary implement, a tow vehicle, or a combination thereof, the cross-tube longitudinally overlaps the hitch assembly along a direction of travel of the agricultural implement, and the cross-tube is positioned vertically above the hitch assembly at least where the cross-tube longitudinally overlaps the hitch assembly.

18. The agricultural implement of claim 17, wherein the cross-tube comprises a cross-tube bracket assembly having at least one bracket, and the at least one bracket comprises a slot, and wherein a pin assembly slidably couples the hitch assembly to the cross-tube.

19. The agricultural implement of claim 18, wherein the slot is configured to enable the pin assembly to slide therein during a height adjustment of the frame assembly.

* * * * *